(12) United States Patent
Bostic et al.

(10) Patent No.: US 7,000,949 B2
(45) Date of Patent: Feb. 21, 2006

(54) STEERING COLUMN MODULE

(75) Inventors: William E. Bostic, St. Clair, MI (US); Alex Koenig, Brischbrunn (DE); Carl Peterson, Warren, MI (US)

(73) Assignee: Takata-Petri, Inc., Auburn Hills, MI (US)

( * ) Notice: Subject to any disclaimer, the term of this patent is extended or adjusted under 35 U.S.C. 154(b) by 0 days.

(21) Appl. No.: 10/737,446

(22) Filed: Dec. 15, 2003

(65) Prior Publication Data

US 2004/0245756 A1  Dec. 9, 2004

Related U.S. Application Data

(60) Provisional application No. 60/433,247, filed on Dec. 13, 2002.

(51) Int. Cl.
*B62D 1/18* (2006.01)

(52) U.S. Cl. ............... 280/779; 280/775; 200/61.54; 439/15; 439/34

(58) Field of Classification Search .............. 439/15, 439/34; 280/771, 779, 775; 200/61.54, 200/61.55, 61.57; 74/493, 494
See application file for complete search history.

(56) References Cited

U.S. PATENT DOCUMENTS

| | | | |
|---|---|---|---|
| 3,754,422 A | 8/1973 | Stackhouse | 70/364 |
| 3,993,936 A | 11/1976 | Meade et al. | 371/101 |
| 4,016,380 A | 4/1977 | Schawinsky et al. | 200/61.27 |
| 4,432,565 A | 2/1984 | Suzuki et al. | 280/779 |
| 4,452,096 A | 6/1984 | Workman | 74/492 |
| 4,507,982 A | 4/1985 | Turner et al. | 74/493 |
| 4,543,848 A | 10/1985 | Beauch | 74/493 |
| 4,703,669 A | 11/1987 | Hyodo | 74/492 |
| 4,786,076 A | 11/1988 | Wierschem | 280/777 |
| 4,856,305 A | 8/1989 | Adams | 70/58 |
| 4,976,123 A | 12/1990 | Ceron et al. | 70/369 |
| 5,119,654 A | 6/1992 | Ceron et al. | 70/369 |
| 5,139,281 A | 8/1992 | Dzioba | 280/775 |
| 5,180,189 A | 1/1993 | Moreno | 280/779 |
| 5,303,952 A | 4/1994 | Shermetaro et al. | 280/731 |
| 5,377,555 A | 1/1995 | Hancock | 74/493 |
| 5,452,624 A | 9/1995 | Thomas et al. | 74/493 |
| 5,606,892 A * | 3/1997 | Hedderly | 74/493 |
| 5,653,146 A | 8/1997 | Barton | 74/492 |
| 5,704,633 A | 1/1998 | Durrani et al. | 280/728.2 |
| 5,714,727 A | 2/1998 | Lecznar et al. | 200/61.54 |
| 5,749,598 A | 5/1998 | Exner et al. | 280/728.2 |
| 5,769,649 A * | 6/1998 | Welschholz et al. | 439/164 |
| 5,884,936 A | 3/1999 | Matsu et al. | 280/728.2 |
| 5,899,497 A | 5/1999 | Spencer et al. | 280/775 |
| 5,917,163 A | 6/1999 | Lecznar et al. | 200/61.54 |
| 5,944,534 A * | 8/1999 | Hoffmann et al. | 439/15 |

(Continued)

*Primary Examiner*—Ruth Ilan
(74) *Attorney, Agent, or Firm*—Foley & Lardner LLP

(57) ABSTRACT

A steering column connected to a vehicle electronic system having an electronic jack and a vehicle steering mechanism for a motor vehicle. The steering column includes a clock spring in electronic communication with a steering wheel. The clock spring includes a first electronic connector for communication with the vehicle electronic system; a second electronic connector including a plug having at least one pin and located at the first end of an electronic conduit to thereby connect with the electronic jack upon assembly within the vehicle; and a third electronic connector at the second end of the electronic conduit in connection with the first electronic connector of the clock spring. Electronic communication throughout the steering column is established by connection of the electronic conduit to the vehicle electronic system.

7 Claims, 5 Drawing Sheets

U.S. PATENT DOCUMENTS

| | | | |
|---|---|---|---|
| 6,035,739 A | 3/2000 | Milton | 74/493 |
| 6,062,101 A | 5/2000 | Higashino | 74/493 |
| 6,095,012 A | 8/2000 | Lutz | 74/493 |
| 6,116,919 A | 9/2000 | Tung | 439/79 |
| 6,127,638 A * | 10/2000 | Masuda et al. | 200/61.27 |
| 6,132,229 A | 10/2000 | Wu | 439/188 |
| 6,152,489 A | 11/2000 | Hedderly et al. | 280/779 |
| 6,183,005 B1 | 2/2001 | Nishijima et al. | 280/731 |
| 6,193,267 B1 | 2/2001 | Tichvon et al. | 280/728.2 |
| 6,225,582 B1 | 5/2001 | Stadler et al. | 200/61.27 |
| 6,234,809 B1 | 5/2001 | Futatsugi | 439/64 |
| 6,236,004 B1 | 5/2001 | Stadler et al. | 200/61.28 |
| 6,334,345 B1 | 1/2002 | Lee | 70/209 |
| 6,351,886 B1 | 3/2002 | Hasegawa | 29/893.32 |
| 6,354,120 B1 | 3/2002 | Tan et al. | 70/252 |
| 6,371,507 B1 | 4/2002 | Durrani et al. | 280/728.2 |
| 6,375,220 B1 | 4/2002 | Kamm | 280/777 |
| 6,386,909 B1 | 5/2002 | Hsia et al. | 439/541.5 |
| 6,389,858 B1 | 5/2002 | Lee | 70/209 |
| 6,390,506 B1 | 5/2002 | Michalski et al. | 280/779 |
| 6,394,493 B1 | 5/2002 | Kieserling et al. | 280/775 |
| 6,403,900 B1 | 6/2002 | Hecht et al. | 200/61.54 |
| 6,417,468 B1 * | 7/2002 | Hecht et al. | 200/61.27 |
| 6,425,601 B1 | 7/2002 | Lewis | 280/728.2 |
| 6,450,058 B1 | 9/2002 | Latz et al. | 74/492 |
| 6,475,005 B1 | 11/2002 | Yu | 439/157 |
| 6,501,033 B1 * | 12/2002 | Pastwa et al. | 200/61.27 |
| 6,583,373 B1 * | 6/2003 | Ketzer et al. | 200/61.54 |
| 6,700,219 B1 * | 3/2004 | Hirschfeld et al. | 307/10.1 |
| 6,731,020 B1 * | 5/2004 | Burr et al. | 307/10.1 |

* cited by examiner

STEERING COLUMN MODULE

CROSS-REFERENCE TO RELATED APPLICATIONS

This Application claims the benefit of the filing date of Provisional Application No. 60/433,247, filed Dec. 13, 2002, and herein incorporated by reference.

TECHNICAL FIELD

The present invention relates generally to vehicle steering assemblies, and more particularly to a modular steering column that facilitates more efficient assembly of the column with an associated vehicle.

BACKGROUND OF THE INVENTION

An ongoing goal of automotive designers has been to optimize the assembly process by simplifying the same at the vehicle assembly plants. A trend has been to coordinate the manufacture of various subassemblies through one supervisory supplier.

With respect to steering column assemblies, known assembly processes bring in various components of the steering column for integration into a finished steering column at the vehicle assembly plant. This typically involves a relatively greater number of manufacturing steps that include electronically connecting each steering column component to the vehicle electronic circuitry. Accordingly, each component must be individually connected to the steering column or to various jacks below the dashboard, for example.

With regard to the mechanical connection of the steering column to the vehicle steering mechanism, the steering column must typically be connected to the vehicle steering mechanism in relatively complicated and time consuming steps. Simplification of the assembly of the steering column to reduce the time and complexity of connection to the vehicle at the vehicle assembly plant would therefore be an improvement in the art.

SUMMARY OF THE INVENTION

In accordance with the present invention, a steering column is designed to provide a modular quick-connect to a vehicle electronic system and a vehicle steering mechanism. A steering wheel is connected to a clock spring in a known manner thereby providing electronic communication with the steering wheel. The clock spring includes a first electronic connector for communication with the vehicle electronic system. An electronic conduit extends along the length of the steering column and is preferably constructed of a rigid material. The electronic conduit includes a first end and a second end for providing electronic communication from the clock spring to the vehicle electronic system at an end of the steering column opposite the steering wheel. A first electronic connector at the first end of the electronic conduit connects the electronic conduit to the vehicle electronic system. A second electronic connector at the second end of the electronic conduit connects the clock spring with the electronic conduit to provide electronic communication between the steering wheel, the clock spring, and the vehicle electronic circuitry.

At least one auxiliary electronic connector is preferably formed on the electronic conduit for electronic connection with at least one steering column component such as a turn signal module. A docking site is formed about the auxiliary electronic connector and thereby provides a seat for flush communication between the electronic conduit and the steering wheel component. A plurality of docking sites formed about a plurality of electronic connectors, for flush communication with a plurality of respective components, is also contemplated. Docking the component against the electronic conduit establishes electronic communication between the component and the vehicle electronic system.

The steering column may further include a rocker mounted proximate the vehicle steering mechanism, whereby a system electronic jack of the vehicle electronic circuitry is fixed on the rocker to facilitate electronic communication of the steering column while adjusting the tilt of the steering column.

A first cylindrical extension extends from the steering wheel and connects the steering wheel to the vehicle steering mechanism. The first cylindrical extension contains a first end configured as a male or female fitting. A second cylindrical extension extends from the steering mechanism or receiver hub for connection with the first cylindrical extension, whereby the second cylindrical extension includes a second end formed as a male or female fitting, opposite and complementary to the fitting of the first end of the first cylindrical extension.

By mating the first end with the second end, the first and second extensions are mechanically coupled in a lock and key configuration. The electronic conduit is fixed to the first cylindrical extension whereby the first electronic connector is longitudinally oriented along the first cylindrical extension to provide simultaneous electronic and mechanical connection as the first cylindrical extension is mated with the second cylindrical extension. Modular assembly of the steering column within the vehicle is facilitated as the steering column is juxtaposed against the system jack and the vehicle steering mechanism.

DETAILED DESCRIPTION OF THE PREFERRED EMBODIMENT(S)

Figure 1:
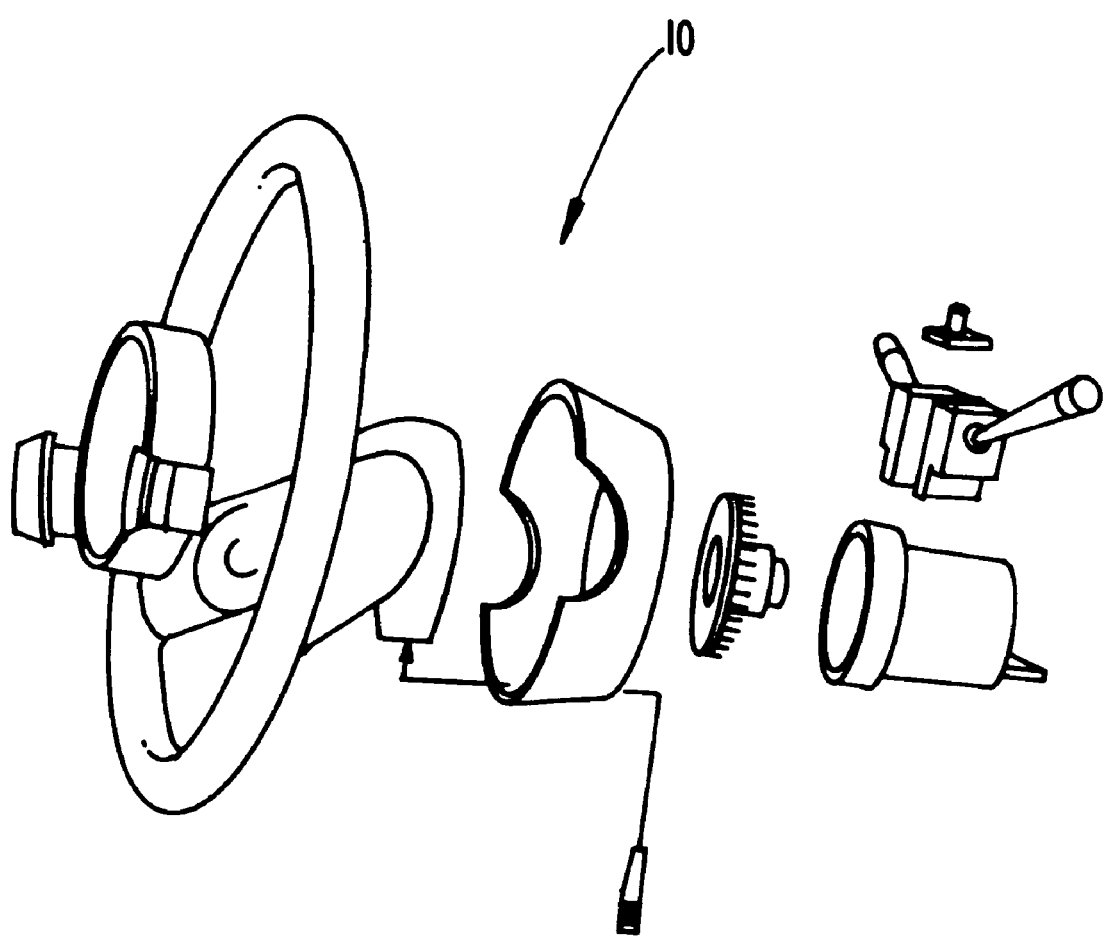
FIG. 1 illustrates an exploded view of one embodiment of the present invention, particularly useful when combined with an upper tilt steering mechanism on the receiver mechanical hub.
Figure 2:
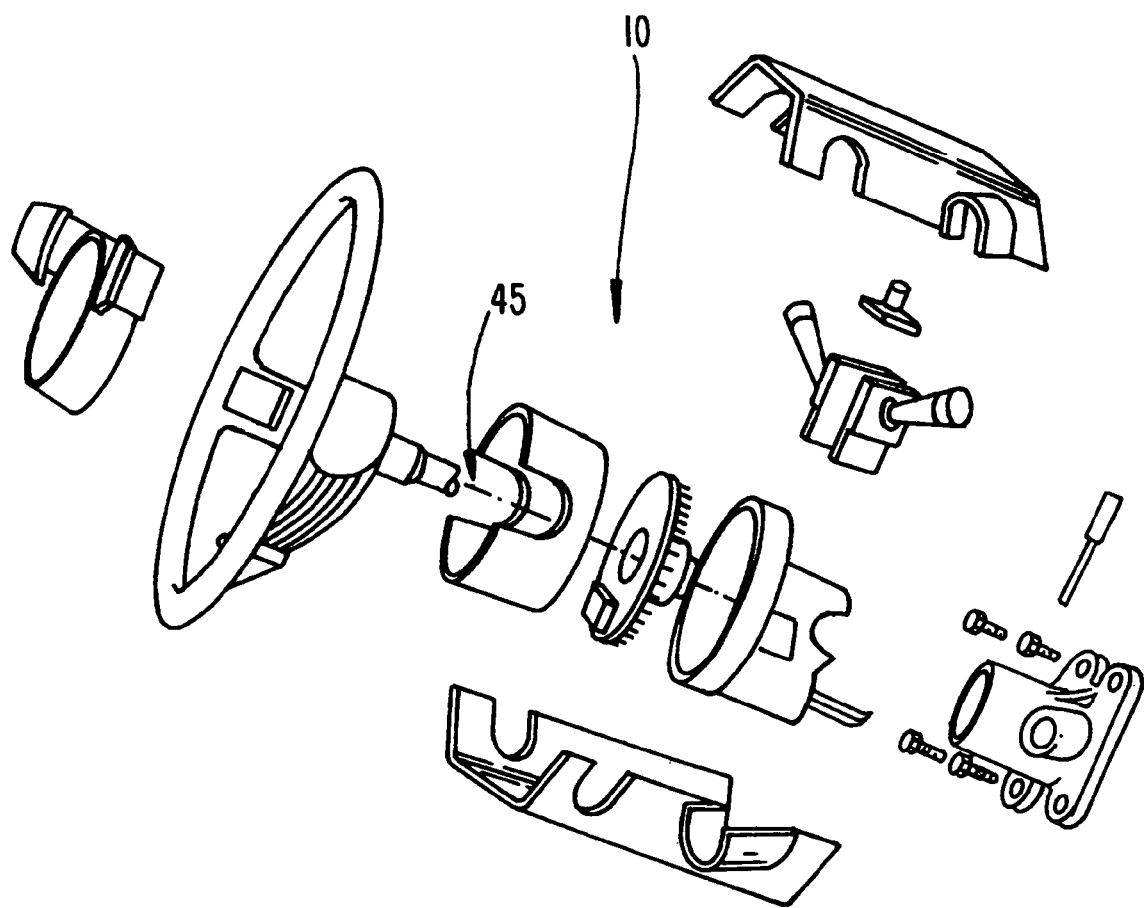
FIG. 2 illustrates an exploded view of one embodiment of the present invention, particularly useful when combined with either a fixed or "low rake" receiver mechanical hub.
Figure 3:
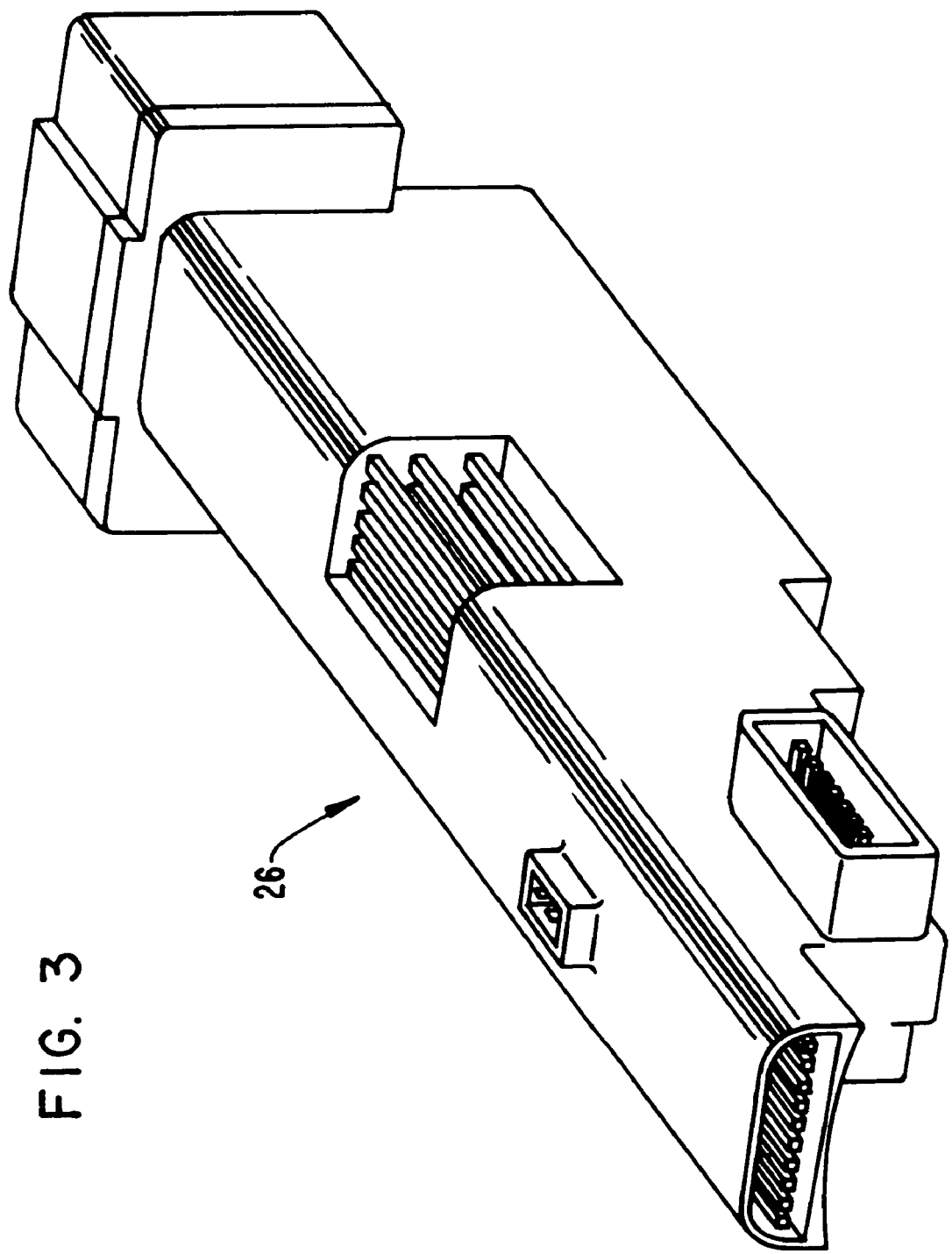
FIG. 3 is a perspective view of the electronic conduit, in accordance with the present invention.
Figure 4:
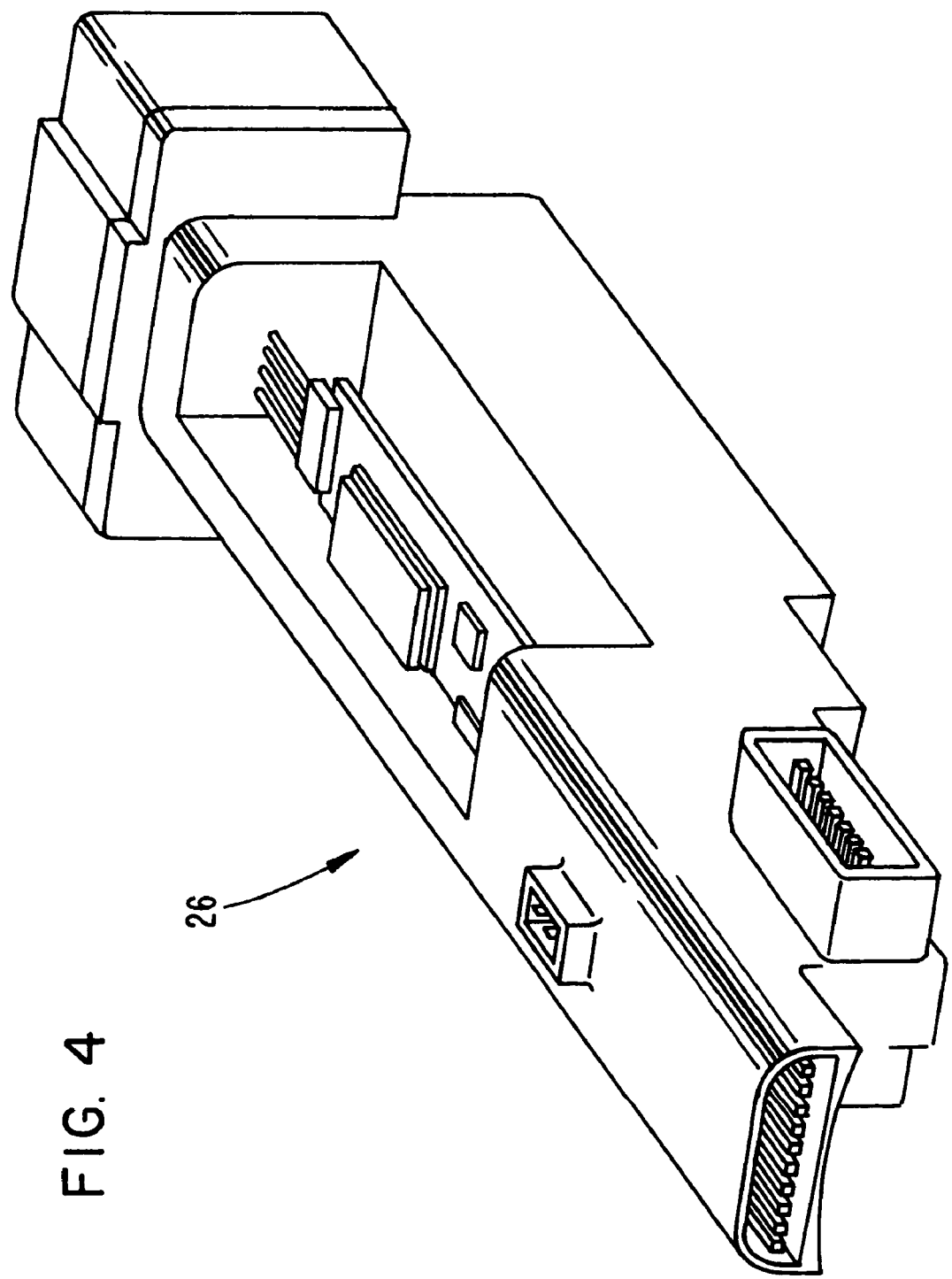
FIG. 4 is a perspective and partial sectional view of the electronic conduit, in accordance with the present invention.

Referring to FIG. 1, there is shown an exploded view of a modular steering column assembly 10, in accordance with the present invention. The present steering column module 10 incorporates a modular plug-in characteristic for both electronic and mechanical communication between the steering column 10 and the vehicle system circuitry 12 and the vehicle steering mechanism 14, respectively. As schematically shown in the figures, a receiver 16 is fixed to the vehicle cross-car beam preferably beneath the instrument panel 54, wherein the receiver 16 facilitates modular docking of the steering column 10 and preferably slidably receives the steering column 10.

In a first aspect of the invention, a first electronic connector or vehicle system jack 18 preferably connected to an associated wire bundle 20 of the vehicle circuitry 12 is housed within the receiver 16 and provides electronic communication between the vehicle circuitry 12 and the steering column circuitry 21. The vehicle circuitry 12 is designed in a known manner to preferably include a decoding function for the various switching that typically occurs along the steering column 10. Naturally, the steering column circuitry 21 is also preferably designed to complement the decoding function of the vehicle circuitry 12. Therefore, an encoding module or circuitry is provided within the steering column circuitry 21 as known in the art whereby, for example, analog data is converted to digital data prior to transmittal of the data to the vehicle circuitry 12. An associated second electronic connector 22 is positioned along an end of the column 10 such that upon docking the steering column 10 within the receiver 16, the first and second plugs 18 and 22 are mated to establish electronic communication between the vehicle and the steering column 10. In accordance with the present invention, the second electronic connector 22 is positioned along a first end 24 of an electronic conduit 26 and integrates the various steering column components 28 or at least one steering column component 28 into at least one or more corresponding electronic conductors 32 preferably disposed along the length of the electronic conduit 26. Stated another way, each desired electronic component 28 of the steering column 10 electronically communicates with a designated auxiliary electronic connector 32 along the electronic conduit 26. The various submodules or components 28 of the steering column 10 may either electronically communicate directly with the electronic conduit 26 or may communicate remotely through intermediate circuitry.

For example, as shown in the figures, a clock spring 34 is preferably employed immediately aft of the steering wheel 36 and installed to the steering wheel 36 in a known manner. To illustrate, an exemplary clock spring 34 formed as described in U.S. Pat. No. 5,704,633, herein incorporated by reference, may be attached to the present steering column 10 and steering wheel 36. Consistent therewith, the clock spring 34 may for example be integrated into a subassembly including the steering wheel 36, the airbag 38, and the clock spring 34.

As shown in the figures, the steering wheel 36 contains an armature 40 and a frame 42. A solid cylindrical bar or first cylindrical extension 44 having an outer or exvolute spline is diecast, welded, or otherwise fixed to the frame 42 and shares an axis 45 extending through the center of the frame 42. As such, the bar 44 when fixed to the frame 42 extends aft of the steering wheel 36 and away from the driver, thereby providing a mechanical coupling or communication between the steering wheel 36 and a mechanical hub or second cylindrical extension 46 of the receiver 16. Stated another way, the bar 44 is coaxially and slidably received within the mechanical hub 46 whereby the outer splines or flutes 48 of the cylindrical bar 44 engage inner or involute splines 50 of the hub 46 upon docking of the assembled steering column 10. Alternatively, the cylindrical bar 44 may instead be a tubular sleeve or female component having inner or involute splines or flutes 50. In that case, the mechanical hub 46 of the receiver 16 would correspondingly be a male rather than female component and as such, upon insertion of the column 10 within the receiver 16, the inner splines 50 of the tube 44 would therefore engage outer splines 48 preferably disposed about the hub circumference. Either way, it is believed that the joining of both the first and second cylindrical extensions 44 and 46, respectively, intermediate of the length of the steering column 10 is particularly useful when mechanically docking the steering column 10 consistent with the modular concept. The tube or cylindrical bar 44 also functions as a rack in that certain steering column components 28 are radially oriented about the tube 44 as they electronically communicate with the electronic conduit 26. Accordingly, the conduit 26 extends along substantially the length of the tube 44 for electronic interface of the components 28 radially oriented about the tube 44.

In a preferred embodiment, the annular clock spring 34 is radially disposed about the tube, immediately aft of the steering wheel 36 and toward the instrument panel 54. The clock spring 34 preferably snaps onto the rear of the steering wheel 36 or is otherwise fixed thereto. An airbag module 38 is fixed to the front of the steering wheel 36 opposite the clock spring 34, but electronically communicates with the clock spring 34 in a known manner. Stated another way, as described in U.S. Pat. No. 5,704,633 for example, the airbag module 38 when fixed to the clock spring 34 sandwiches the steering wheel 36 therebetween. In accordance with the present invention, electronic contacts of the electronic conduit 26 electronically communicate or are mated with corresponding electrical contacts on the clock spring 34. Therefore, a third plug or electronic connector 56 on the clock spring 34 mates and interfaces with a corresponding fourth plug or electronic connector 58 of the electronic conduit 26. In a preferred embodiment, the electronic conduit 26 is integrally molded into the clock spring 34 housing, thereby extending aft of the steering wheel 36 in the same direction as the tube. However, the clock spring 34 need not be molded to the electronic conduit 26, but instead may be attached to the electronic conduit 26 to form a subassembly.

Accordingly, upon a crash event and in a known manner, the clock spring 34 communicates a signal from a crash sensor (not shown) for example, thereby activating the airbag 38. A number of electrical connections extend from components on the steering wheel 36 and are connected to the clock spring 34 in a known manner. A rear steering wheel cover 60 preferably snaps over the clock spring 34. An opening in the rear cover 60 accepts passage of the electronic conduit 26 therethrough. If desired, the clock spring 34 may instead be installed aft of the rear cover 60 while still electronically communicating with components 28 on the steering wheel 36.

As shown in the figures, at least one and preferably a plurality of various auxiliary plugs, jacks, and/or electronic connectors 64 may be disposed along the length of the conduit 26 and facilitate attachment and electronic communication of other functional components 28. Or, the steering wheel 36 may comprise all of the functional switching desired for vehicle operation. As also shown in the figures, exemplary auxiliary electronic connectors 64 contain copper traces or frets 66, or pins or sockets 66, that basically extend radially outward thereby facilitating flush communication with a corresponding electronic connector of a respective component 28. At least one docking site 68, and more preferably a plurality of docking sites 68, each docking site 68 preferably corresponding to a respective functional component 28, facilitates flush communication between the component 28 and its respective auxiliary electronic connector 64. Accordingly, the docking site 68 might contain a pair of substantially parallel recessed grooves essentially transverse or parallel to the longitudinal axis 45 of the electronic conduit 26, that would be mated with a pair of correspondingly oriented extensions on a respective component 28, thereby facilitating slidable engagement of the component against the electronic conduit 26 and mating of opposing frets 66, for example. Or, the docking site 68 might instead include a plug or a jack 70 surrounded by a peripheral jacket 72 that provides juncture rigidity as a corresponding plug or jack 74 from an associated component is connected thereto.

As shown in U.S. Pat. No. 6,225,582, herein incorporated by reference, a centrally arranged support board could be integrated into the electronic conduit 26 for easy removal and replacement of steering column switches, for example. Associated circuitry as described therein could be employed as described. Or, as described in U.S. Pat. No. 6,417,468, herein incorporated by reference, electrical plugs integrated into steering column switches may be employed to connect the switches to the electronic conduit 26. Exemplary turn signal and hazard warning control apparatuses could be designed as described in U.S. Pat. No. 4,016,380, herein incorporated by reference. In essence, any component 28 useful in the steering column 10 could be connected as described above. Other known or suitable electronic connectors 64 may also be utilized.

The various components 28 of the steering column 10 are made by methods known in the art. The steering wheel 36 may, for example, have an armature 40 and frame 42 that is die cast, and then coated with a resilient coating by application of known foam mold processes. The first cylindrical extension 44 may, if desired, be die cast integral to the steering wheel 36 thereby obviating the need to separately fix the extension 44 to the steering wheel 36 after formation thereof. The various electronic components 28 may be supplied by manufacturers know in the art. For example, Valeo Schalter and Sensoren GmbH of Germany and/or Yazaki Corporation of Japan may provide various steering column components 28 as described in U.S. Pat. Nos. 6,183,005 and 6,417,468, herein incorporated by reference. Alternatively, electronic connectors may be manufactured as described in U.S. Pat. Nos. 6,132,229, 6,116,919, 3,993,936, 6,475,005, and 6,386,909, herein incorporated by reference, and then integrated with known components 28. The electronic conduit 26 may be molded from rigid polymers and simultaneously inlayed with copper metal traces 66 and/or copper or metallic tubes 66 coextensive with the electronic conduit 26. In other words, the various connectors 64 may be made from known methods. It is contemplated that the mechanical hub or second cylindrical extension 46, and a rocker (described below) may be die cast or otherwise formed and then integrated into the cross car beam 78 with the cooperation of the original equipment manufacturer and/or manufacturers of the vehicle steering mechanism 14 such as Eaton. In the same way, the system circuitry 12 supplied on the first electronic connector 18 at the mechanical hub 46 may also be provided with the cooperation of the original equipment manufacturer, for example.

Figure 5:
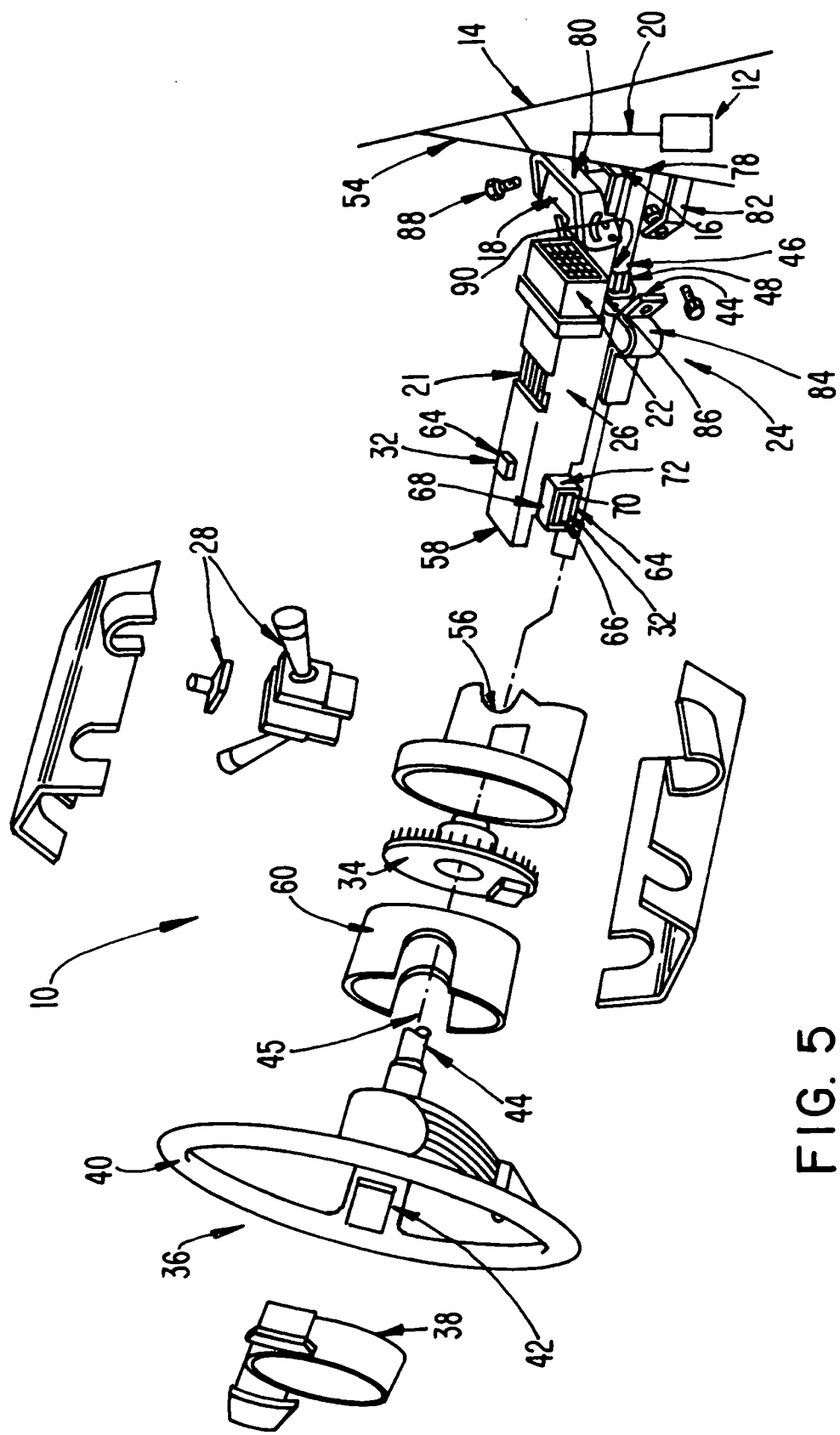
FIG. 5 is a perspective view of the interface between the steering column module and the vehicle steering mechanism and system electronics. As shown, a receiver or vehicle system plug is preferably fixed to the vehicle structure to mate with a corresponding conduit plug once the steering column is docked against the receiver.

FIG. 5 is a perspective view of the interface between the steering column module 10 and the receiver 16. As shown, the first plug or receiver plug 18 is fixed to the vehicle structure 78 to mate with the second electronic connector or electronic conduit plug 22 once the steering column 10 is docked against the receiver 16. A cam lock 80 is pivotally rotatable about the receiver jack 18 and assists in firmly seating the conduit plug 22 against the receiver jack 18. The communication between the mechanical hub or second cylindrical extension 46, and the column rack or first cylindrical extension 44 is further illustrated. As also shown in the figures, the steering column 10 may be firmly fixed to the receiver 16 simply by bolting or fixing at least one receiver bracket 82 to at least one steering column bracket 84.

It should be emphasized that in accordance with the present invention, connecting all of the steering column circuitry 21 to one conduit 26 facilitates simultaneous electronic and mechanical docking of the steering column 10: mechanical docking by mating the rack 44 and the mechanical hub 46, and, electronic docking by mating the first and second plugs 18 and 22 of the receiver 16 and the conduit 26, respectively. Unlike the related art, integrating the rack 44 centrally of the steering wheel 36 and integrating the electronic circuitry into one electronic conduit 26 rather than a plurality of plugs as is conventionally practiced, enables one-step docking at the assembly point. In essence, the various steering column component circuitries are consolidated into one electronic conduit 26 communicating with one receiver plug 18, rather than many. The present invention therefore facilitates complete assembly of the entire steering column 10 prior to modular installation at the assembly plant. As such, simple insertion and fastening of the steering column 10 into the receiver accomplishes simplified electronic and mechanical docking at the assembly plant.

It should be further emphasized that the second electronic connector 22 is fixed at a point relative to the first end 86 of the first cylindrical extension 44, thereby ensuring consistent mechanical and electronic alignment during coupling of the column 10 with the vehicle. Bolts 88 exemplify fasteners that may be employed to secure the column 10 to the receiver and/or instrument panel 54.

Finally, the tube or cylindrical bar 44 may be designed to accommodate tilt steering. As described in U.S. Pat. No. 5,606,892, herein incorporated by reference, when tilt steering is desired, the mechanical hub 46 of the receiver 16 may also include either a "low rake" or low pivot point recessed within the instrument panel 54. Or, it may include an upper tilt steering mechanism integral to the mechanical hub 46 at a point where the mechanical hub 46 connects with the steering column bar 44. An exemplary tilt steering mechanism is described in U.S. Pat. No. 6,450,058, herein incorporated by reference. In one low rake embodiment, the receiver plug 18 shown in FIG. 5 would preferably be fixed at a point between the pivot point on the mechanical hub 46 and the steering wheel 36. A flexible wire bundle 20 connected to the receiver plug 18 would accommodate any change in the tilt or pivoting action of the mechanical hub 46. In the same way, the tilt steering mechanism could also be fitted with a receiver plug 18 connected to a flexible wire harness 20 thereby facilitating tilt steering and yet adhering to the modular concept. One of ordinary skill in the art will appreciate that other known designs may be utilized to the extent they do not compromise the modular concepts described herein.

Alternatively, the receiver plug 18 connected to a flexible wire harness 20 could be fixed to the cross-car beam 78 on a pivoting rocker or seat thereby orienting the angle of the receiver plug 18 to the angle of the steering column 10 once tilted. In the same way, the mechanical hub or second cylindrical extension 46 could be coupled to the vehicle steering mechanism 14 in a known way, but still fixed to the rocker to ensure consistent mechanical and electrical alignment.

The present description is for illustrative purposes only, and should not be construed to limit the present invention in any way. Thus, those skilled in the art will appreciate that various modifications might be made to the presently disclosed embodiments without departing from the scope of the invention as described above and as stated in the appended claims.

What is claimed is:

1. A steering column connected to a vehicle electronic system having an electronic jack and a vehicle steering mechanism for a motor vehicle comprising:
   a steering wheel;
   a clock spring in electronic communication with said steering wheel, said clock spring comprising a first electronic connector for communication with said vehicle electronic system;
   an electronic conduit comprising a first end and a second end for providing electronic communication from said clock spring to said vehicle electronic system;
   a second electronic connector including a plug having at least one pin and located at said first end of said electronic conduit to thereby connect with the electronic jack upon assembly within said vehicle; and
   a third electronic connector at said second end of said electronic conduit in connection with said first electronic connector of said clock spring;
   wherein electronic communication throughout the steering column is established by connection of said electronic conduit to said vehicle electronic system; and
   wherein said steering column further comprises a rocker mount proximate said steering mechanism, whereby said system electronic jack is fixed on said rocker mount to facilitate electronic communication with said steering column while adjusting the tilt of said steering column.

2. The steering column of claim 1 wherein said column further comprises:
   at least one auxiliary electronic connector radially positioned about said electronic conduit;
   at least one component in electronic communication with said at least one auxiliary electronic connector; and
   a docking site about said at least one auxiliary electronic connector for seating said at least one component against said electronic conduit.

3. The steering column of claim 1 further comprising:
   a plurality of auxiliary electronic connectors on said electronic conduit, each auxiliary electronic connector radially positioned about said electronic conduit;
   a plurality of components in electronic communication with said plurality of auxiliary electronic connectors, each of said components corresponding to a respective auxiliary electronic connector; and
   a plurality of docking sites, each of said docking sites arranged about and corresponding to a respective one of said plurality of auxiliary electronic connectors, each of said docking sites employed to seat a corresponding one of said plurality of components,
   wherein docking said plurality of components against said electronic conduit establishes electronic communication between said plurality of components and said vehicle electronic system.

4. The steering column of claim 2 wherein said at least one auxiliary electronic connector is formed from a first set of electronic frets and said at least one component is formed with a second set of electronic frets whereby upon docking said at least one auxiliary electronic connector against said component, said first set of electronic frets and said second set of electronic frets are mated together thereby facilitating electronic communication between said component and said vehicle electronic system.

5. The steering column of claim 2 wherein said at least one auxiliary electronic connector is formed from an electronic jack and said at least one component is formed with a plug comprising at least one pin, whereby upon docking said at least one auxiliary electronic connector against said component, said plug is mated with said electronic jack thereby facilitating electronic communication between said component and said vehicle electronic system.

6. The steering column of claim 1 wherein said electronic conduit is formed with copper traces.

7. The steering column of claim 2 wherein said docking site comprises a jacket extending from said at least one auxiliary electronic connector and said component is fixed at least partially through said jacket and against said at least one auxiliary electronic connector.

* * * * *